O. A. MURPHEY.
HUB ATTACHING DEVICE.
APPLICATION FILED JUNE 28, 1910.
991,349.
Patented May 2, 1911.
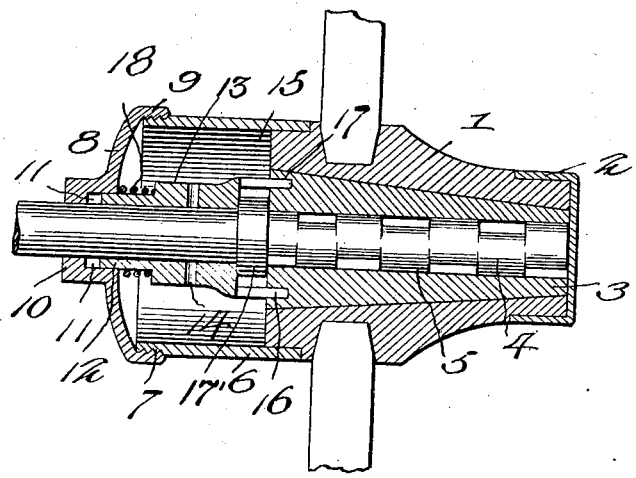
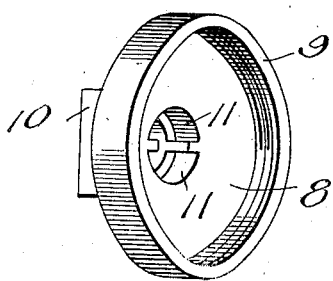
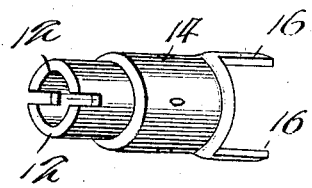
Witnesses
Inventor
Otis A. Murphey
By Victor J. Evans
Attorney

UNITED STATES PATENT OFFICE.

OTIS A. MURPHEY, OF ATLANTA, GEORGIA.

HUB-ATTACHING DEVICE.

991,349. Specification of Letters Patent. Patented May 2, 1911.

Application filed June 28, 1910. Serial No. 569,334.

*To all whom it may concern:*

Be it known that I, OTIS A. MURPHEY, a citizen of the United States, residing at Atlanta, in the county of Fulton and State of Georgia, have invented new and useful Improvements in Hub-Attaching Devices, of which the following is a specification.

This invention relates to hub attaching devices and the object of the invention is to avoid the use of the usual lock nut on the end of the hub and at the same time to provide an absolutely dust-proof bearing for wheel vehicles.

Further objects of the invention will appear as the following specific description is read in connection with the accompanying drawings which form a part of this application and in which:

Figure 1 is a longitudinal section through a hub and its supporting axle. Fig. 2 is a detail perspective view of the rear cap. Fig. 3 is a detail perspective view of the intermediate clutch member.

Referring more particularly to the drawings, 1 represents the hub of ordinary construction having screwed upon its outer end in place of the usual sand band a closing cap 2 which prevents the entrance of dust or dirt to the usual boxing 3 which surrounds the bearing end of the axle 4. The bearing end of this axle is preferably formed with alternating semi-cylindrical projections 5 which bear against the boxing 3 and lessen the friction. At the same time the space in between the same acts to hold lubricating material. The hub is provided with a rear sand band 6 which is threaded on its outer end as at 7, to receive the closing cap 8 which is in the form of a concavo-convex disk having threaded flanges 9 to engage over the sand band 6 and is also provided with a squared boss 10 which permits the use of a wrench to disconnect the same from the hub.

The closing cap 8 has on its inner face a pair of recesses 11 which are adapted to be engaged by projections 12 carried upon the inner end of an intermediate clutch member 13 which surrounds the shaft or axle 4 and has a plurality of apertures running therethrough, one of which is shown at 14 to permit the entrance of oil from the space 15 which is formed between the clutch member and the sand band 6. The outer end of the clutch member is provided with longitudinally extending fingers 16 which enter recesses 17 in the inner end of the boxing and cause the clutch member and the end closing cap 8 to rotate with the hub. The outer end of the clutch member 13 abuts against a shoulder 17' upon the axle 4 and the boxing 3 abuts against the outer side of this shoulder whereby it will be seen that the hub cannot move inwardly on account of the engagement of said boxing with the shoulder and that it cannot move outwardly on account of the clutch member abutting the inner face of the shoulder. Surrounding the inner reduced end of the clutch member is a spiral spring 18 which is compressed between the clutch member and the end cap 8 so as to normally hold the said clutch member with its finger 16 in the recesses 17 of the boxing 3. This spring holds the hub firmly in position upon the axle and yet permits a desirable play so as to avoid the consequent friction of an absolutely tight engagement of the hub with the collar or shoulder 17'.

With this type of hub attaching device, it will be clearly seen that no lock nut is necessary and the end of the axle 4 is therefore rounded off and terminates entirely within the hub 1, thus allowing the space within the closing cap 2 and the space 15 to be filled with any suitable absorbent material which may be impregnated with a lubricating fluid and which will therefore consistently keep the bearing in proper running order.

Having thus described the invention, what is claimed, is:—

1. In a hub attaching device, the combination with a collared axle of a hub mounted upon the collar and adapted to engage one side of the axle, a sand band surrounding the axle and carried by the hub, a cap revolubly mounted upon the axle and secured to said band a clutch member interconnecting the hub and cap, and means to resiliently hold said clutch member in engagement with the opposite side of said collar.

2. In a hub attaching device, the combination with a collared axle, of a hub mounted on the axle and adapted to engage said collar on one side thereof, a sand band carried by the hub, a cap revolubly mounted on the axle and threaded upon the sand band, a clutch member revolubly mounted upon the axle, and interposed between the opposite side of the collar, and said cap, means on the clutch member for engaging the cap, means on the clutch member for engaging the hub, and means positioned between the cap and clutch member for holding said hub engaging means of the clutch member in position.

In testimony whereof I affix my signature in presence of two witnesses.

OTIS A. MURPHEY.

Witnesses:
HOLLAND B. LOWNDES,
W. T. WINN.

Copies of this patent may be obtained for five cents each, by addressing the "Commissioner of Patents, Washington, D. C."